April 23, 1935.   C. A. MATHEY ET AL   1,998,729
PIPE CUTTING APPARATUS
Filed May 23, 1934

INVENTORS
Chester A. Mathey and
Charles B. Harter.
BY Arthur C. Brown
ATTORNEY

Patented Apr. 23, 1935

1,998,729

UNITED STATES PATENT OFFICE 1,998,729

PIPE CUTTING APPARATUS

Chester A. Mathey and Charles B. Harter,
Tulsa, Okla.

Application May 23, 1934, Serial No. 727,089

8 Claims. (Cl. 266—23)

This invention relates to pipe cutting apparatus and more particularly to means supporting a pair of cutting torches for circumferential movement about the periphery of a pipe for effecting annular cuts through the walls thereof, and has for its principal objects to provide for ready application and adjustment of an apparatus of this character to a pipe, to provide for accurately supporting the cutting torches for planetary movement about the pipe in planes extending at right angles to the axis of the pipe, whereby the cut or cuts are square with the axis of the pipe, and to provide an apparatus readily adapted for mounting on various diameters of pipe.

In accomplishing these and other objects of the invention we have provided improved details of structure, the preferred form of which is illustrated in the accompanying drawing, wherein.

Figure 1:
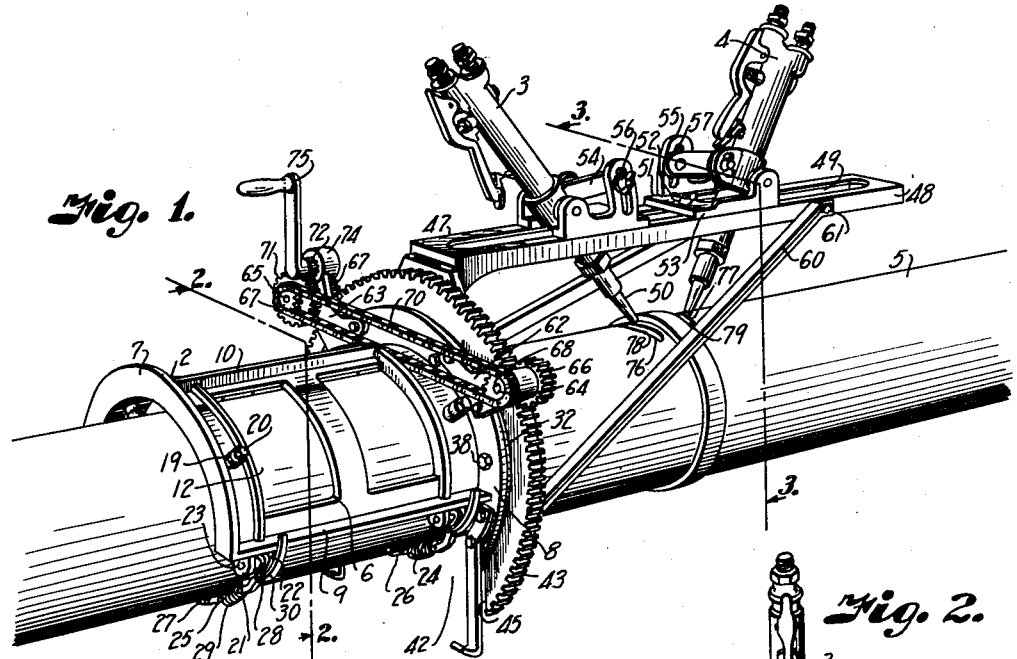
Fig. 1 is a perspective view of a pipe cutting apparatus embodying the features of the present invention.
Figure 5:
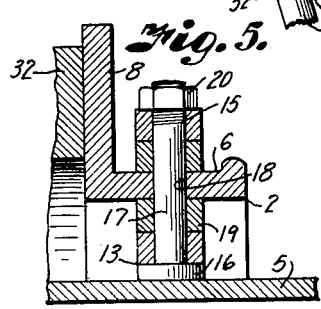
Fig. 5 is a detail section through a portion of the saddle on the line 5—5, of Fig. 3, particularly illustrating the means for accommodating the cutting apparatus to pipes of smaller diameter than the saddle.
Figures 4, 6:
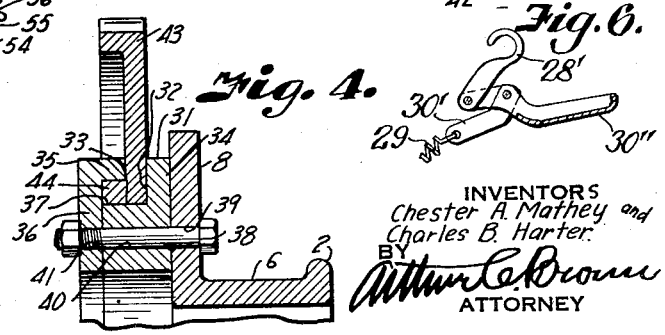
Fig. 4 is an enlarged detail section through the ring gear and track members and the adjacent end of the supporting saddle on the line 4—4, of Fig. 3.
Fig. 6 is a detail view of one of the toggle levers for securing the saddle to a section of pipe.

Referring more in detail to the drawing:

1 designates a pipe cutting apparatus embodying the features of the present invention, and which includes a saddle member 2 adapted to engage over the upper portion of a pipe for supporting a pair of cutting torches 3 and 4 for planetary movement about the pipe 5. The saddle member 2 includes a semi-cylindrical body 6 having laterally extending end flanges 7 and 8 connected by longitudinal ribs 9, 10 and 11 on the respective sides of openings 12 that lighten the weight of the casting and facilitate its application to the pipe. In order to adapt the saddle to smaller diameter pipes the ends of the body portions carry adjustable feet 13 and 14 for spacing the axis of the saddle concentrically with the axis of the pipe. The feet 13 and 14 preferably comprise bolts 15 having heads 16 engaging the periphery of the pipe, and shanks 17 extending through openings 18 in the saddle, as best illustrated in Fig. 5 and carrying spacing washers 19 that are retained by nuts 20 threaded on the shanks of the bolts. When adjusting the concentric position of the saddle on a pipe a suitable number of washers will be sleeved on the shank of the bolts to space the heads thereof the proper distance from the inner periphery of the saddle and the remaining washers will be placed on the projecting ends of the shanks and secured by the nuts 20 to retain the heads 16 in definite spaced relation to the axis of the pipe.

Depending from the side ribs 9 and 11 adjacent the ends thereof are pairs of spaced ears 21 and 22 carrying cross pins 23 and 24 for securing the ends of flexible retaining members or cinches 25 and 26, which engage under the pipe to which the saddle is applied. The retaining members 25 and 26 preferably include chain sections 27 having one of their ends secured to the pins 23 at one side of the saddle and their other ends connected with hooks 28 by means of coil springs 29 and toggle levers 30, the hooks 28 engaging over the pins 24 at the opposite side of the saddle. The springs 29 accommodate the length of the flexible members to different diameters of pipe and the toggle levers 30 tension the springs to retain the hooks in engagement with the pins 24. The toggle levers 30 include a link 30' having one end connected to a spring 29 and its opposite end pivotally mounting a hand lever 30" having an offset tail portion 28' for pivotally mounting a hook 28. When the hand lever 30" is swung toward the hook 28, the tail portion 28' thereof is moved downwardly into alignment with the link 30' so that the pivot point of the hook passes dead center relation between the pivot point of the lever and the connection of the link 30' with the spring to retain the hook in latched condition under tension of the spring. When the lever 30" is swung in the opposite direction, the tail portion of the lever swings the hook outwardly to release it from engagement with the cross pin 24 to permit removal of the saddle from the pipe.

Figure 3:
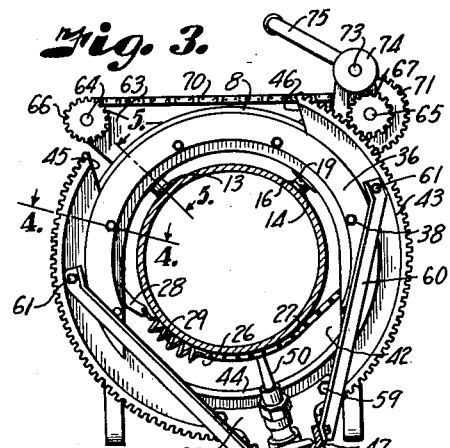
Fig. 3 is a similar cross section on the line 3—3, of Fig. 1.

Fixed to the end flange 8 of the saddle is a segmental ring 31 having an annular inset shoulder 32 to form an annular seat 33 and a radial flange 34, which cooperate with an inwardly extending flange 35 on a keeper ring 36 to form an annular track groove 37 of L-shaped cross section. The ring 31 and keeper ring 36 are secured in concentric axial alignment with the saddle by bolts 38 extending through openings 39 on the flange 8 and through aligning openings 40 and 41 in the respective ring members. The ends of the ring members 31 are formed on lines tangent to the inner diameter of the saddle 2, as best illustrated in Fig. 3, to form a slotted throat 42 to pass the pipe 5 when the saddle is placed thereon.

Rotatably mounted in the angle shaped track is a ring gear 43 having an inner diameter adapted to engage the seat 33, and an inwardly extending flange 44 interlocking with the flange 35 of the keeper ring 36, whereby the ring gear is retained in guided relation with the track member for rotation about the axis of the pipe, as later described.

Figure 2:
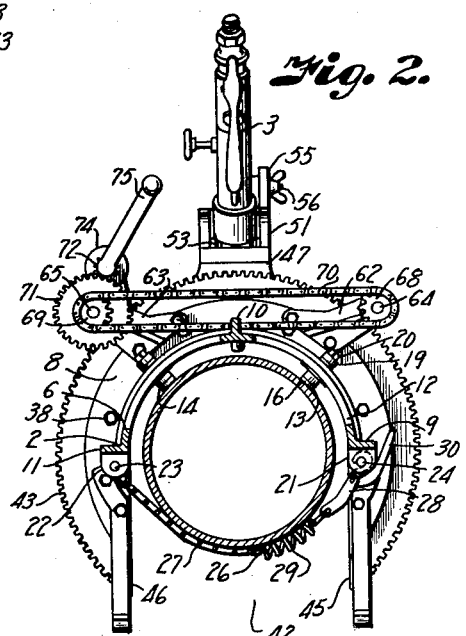
Fig. 2 is a cross sectional view on the line 2—2, of Fig. 1.

The ends 45 and 46 of the ring gear segment are spaced apart in conformity to the width of the throat 42, as illustrated in Fig. 2, the length of the ring segment being such that when one end thereof is moving across the throat the other end is retained in guiding relation with the track member to assure that the opposite end is moving in alignment to re-enter the opposite end of the track member, and due to the fact that the ends thereof are spaced apart a less distance than the inner diameter of the track, the ring will be retained thereon in all positions about the periphery of the ring.

Fixed to the segmental ring gear midway of the ends thereof is an arm 47 for mounting the cutting torches 3 and 4. The arm 47 includes a channel-shaped body 48 provided with a slotted face portion 49 through which the nozzle ends 50 of the cutting torches are projected. The cutting torches are pivotally mounted on brackets 51 slidable on the face of the arm and secured thereto by clamping screws 52 extending through the base portion 53 of the brackets. The cutting torches are supported in adjusted angular relation with each other by means of arms 54 having their ends adjustably clamped to arcuate shaped ears 55 on the brackets 51 by bolts 56 extending through the arms and the arcuate openings 57 in the ears, as shown in Fig. 1.

The inner end of the arm is provided with a depending bracket 58 secured to the outer face of the ring gear by fastening devices 59 shown in Fig. 3. The outer end of the arm 48 is braced from the ends of the ring gear by braces 60 having their outer ends fixed to the side flanges of the arm and their inner ends to the ring gear by fastening devices 61. The braces 60 thus support the arm 48 in parallel axial alignment with the pipe and at right angles to the ring gear segment so that when the ring gear segment is rotated about the track the flames issuing from the nozzles of the cutting torches are revolved through planes extending exactly at right angles to the pipe.

In order to rotate the ring gear segment the flange 8 is provided with radial brackets 62 and 63 spaced apart a greater distance than the spacing between the ends of the ring gear, and rotatably mounted therein are shafts 64 and 65 carrying pinions 66 and 67 meshing with the ring gear and sprockets 68 and 69 that are operably connected by a chain belt 70. One of the shafts is provided with a gear 71 which is driven by a pinion gear 72 fixed on a shaft 73 rotatably mounted in the bracket extension 74. The shaft 73 is manually rotated by means of a crank or the like 75.

It is apparent that when the crank 75 is rotated the gear 72 drives the gear 71 to effect rotation of the pinion 67 and the pinion 66 through the sprocket and chain connection. Rotation of the pinion gears drives the ring gear to carry the cutting torches about the periphery of the pipe to effect spaced cuts 76 and 77 having beveled edges 78 and 79. Owing to the fact that the ring gear is guidingly supported by the track throughout its entire movement and the track is securely anchored to the pipe, the cuts 76 and 77 will be exactly at right angles to the axis of the pipe so that a new section of the pipe can be abutted against and welded thereto to take the place of the section removed.

In using a cutting apparatus constructed and assembled as described, the saddle 2 is clamped to the pipe adjacent the point at which the cut is to be made, the spacing feet having been adjusted to concentrically align with the axis of the saddle with that of the pipe so that the ring gear 43 will be rotated about the axis of the pipe when the cut is being made. After the saddle has been adjusted to the side of the pipe, it is not again necessary to adjust the spacing feed unless it is desired to cut a pipe of different diameter. When the saddle is applied to the pipe the opening between the ends of the ring gear will have been aligned with the throat of the track to permit mounting of the saddle, but when the ring gear is rotated the ends thereof will move in guided relation across the throat of the track and retained thereby for rotation about the pipe.

The cutting torches are then adjusted on the arm 48 and the nozzles directed at the proper angle to make the cuts 76 and 77. The crank 75 is then rotated to effect gradual planetation of the arm 48. As the cutting torches burn through the wall of the pipe so that when the torches have made one revolution about the pipe the section of pipe between the flames is completely severed.

After the cut has been made the ring gear is moved so that the ends thereof align with the sides of the throat in the track or rail member. The toggle levers 30 are then loosened to permit removal of the hooks from the pins 24, after which the saddle carrying the ring gear and torches is lifted from the pipe, completing the operation.

From the foreging it is apparent that we have provided a cutting apparatus which may be readily attached to a pipe without disassembling the ring gear or any part of the apparatus, and that due to the mounting of the ring gear segment the cuts as produced in the pipe are smooth and regular so that a pipe section can be welded thereagainst without reshaping of the ends of the pipe.

What we claim and desire to secure by Letters Patent is:

1. In a pipe cutting apparatus, segmental ring and track members having ends spaced apart to pass the members over a pipe to be cut, clamping means for securing the track member to the pipe, pipe cutting means carried by the ring member, a pair of driving members supported in fixed relation to the track member and having driving contact with the segmental ring member at spaced points greater than the spacing of the ends of said ring member for moving the ring member on the track member to carry the cutting means about the periphery of the pipe.

2. In a pipe cutting apparatus, segmental ring and track members having ends spaced apart to pass the members over a pipe to be cut, a saddle supporting the track member, clamping means for securing the saddle to the pipe, pipe cutting means carried by the ring member, a pair of driving members supported in fixed relation to the saddle and having driving contact with the segmental ring at spaced points greater than the spacing of said ends of the segmental ring for moving the ring member on the track member to carry the cutting means about the periphery of the pipe.

3. A pipe cutting apparatus including segmental ring gear and track members having ends spaced apart to pass the members over a pipe to be cut, means for clamping the track member to the pipe, a pair of pinion gears on said track member and spaced apart a greater distance than the width of the space between the ends of said members and meshing with the ring gear member, whereby one of said pinion gears is in mesh with the ring gear while the other is moving between the ends thereof, means operably connecting the pinions, pipe cutting means carried by the ring gear member, and means for rotating the pinions to cause movement of the pipe cutting means about the periphery of the pipe.

4. In a pipe cutting apparatus, a saddle member, flexible members engaging under the pipe to be cut for securing the saddle member, a segmental track member secured to one end of the saddle member, a segmental ring gear on the track member, an arm projecting from the ring gear on the side opposite to the saddle member, a pair of spaced driving members having toothed engagement with said ring gear for moving the ring gear on the track member to carry the arm about the axis of the pipe, means for rotating said driving members and a pair of cutting torches supported on the arm and having nozzles converging toward the axis of the pipe for directing cutting flames against the pipe upon movement of said ring gear.

5. In a pipe cutting apparatus, segmental ring and track members having ends spaced apart to pass the members over a pipe to be cut, adjustable clamping means for securing the track member concentrically of the pipe, pipe cutting means carried by the ring member, a pair of driving members fixed on one of said members and having driving connection with the other member at points spaced apart a greater distance than the spaced ends of said members and means actuating the driving members for moving the ring member on the track member to carry the cutting means about the periphery of the pipe.

6. In a pipe cutting apparatus, segmental ring gear and track members having ends spaced apart to pass the members over a pipe to be cut, clamping means for securing the track member to the pipe, pinions rotatably mounted on the track member and meshing with the ring gear, sprockets fixed in driving relation to the pinions, a chain belt connecting the sprockets, means for actuating one of the pinions to actuate the other through said chain and sprockets, and pipe cutting means carried by the ring gear for movement about the periphery of the pipe to cut said pipe.

7. A pipe cutting apparatus including segmental ring gear and track members having ends spaced apart to pass the members over a pipe to be cut, means supporting said members in concentric relation with the axis of the pipe, pipe cutting means carried by one of said members, pinions on the track member and meshing with the ring gear member, and means for simultaneously rotating the pinions to effect movement of the ring gear member for carrying the cutting means about the periphery of the pipe.

8. A pipe cutting apparatus including segmental ring gear and track members having ends spaced apart to pass the members over a pipe to be cut, means supporting said members in concentric relation with the axis of the pipe, pipe cutting means carried by one of said members, pinions on the track member and meshing with the ring gear member, a chain and sprocket connection between said pinions, and means for rotating one of the pinions to effect movement of the ring gear member for carrying the cutting means about the periphery of the pipe.

CHESTER A. MATHEY.
CHARLES B. HARTER.